Nov. 27, 1962   C. W. LEYBOURN ET AL   3,065,668
MAP HOLDER AND VIEWING DEVICE
Filed Dec. 22, 1954   2 Sheets-Sheet 1
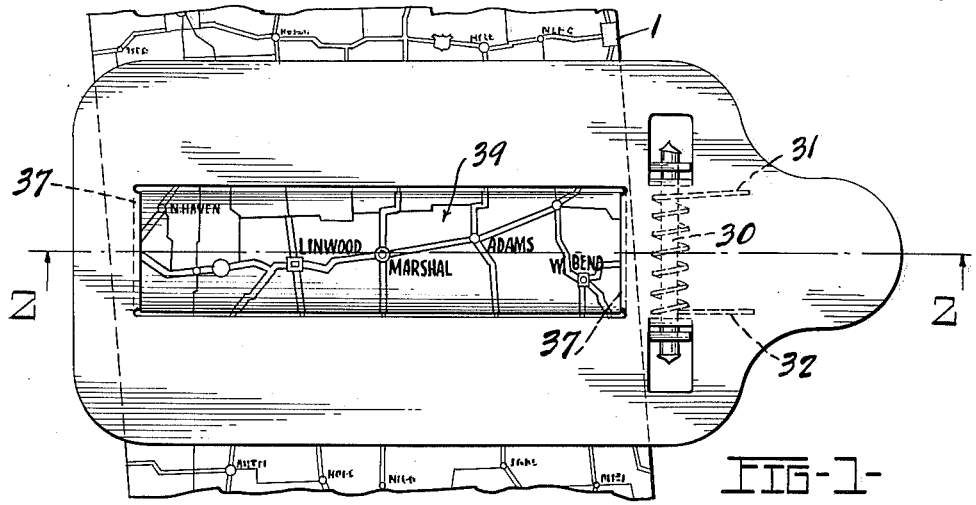
FIG-1-
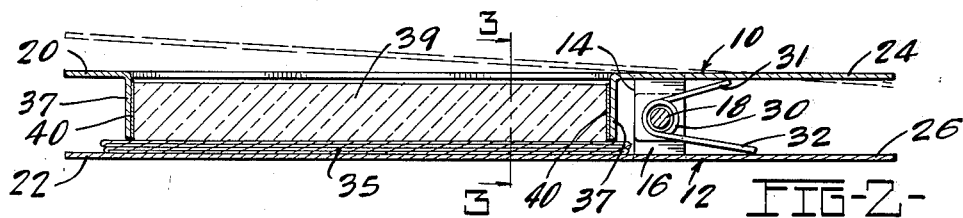
FIG-2-
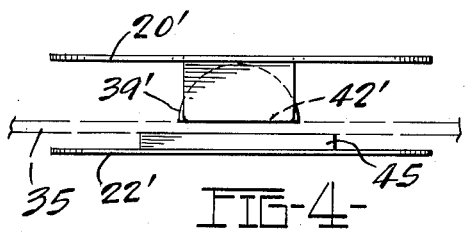
FIG-4-
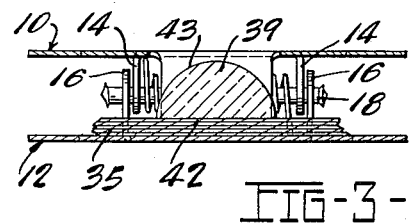
FIG-3-
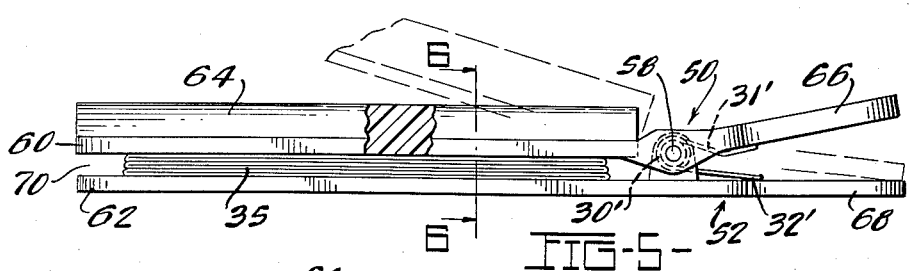
FIG-5-
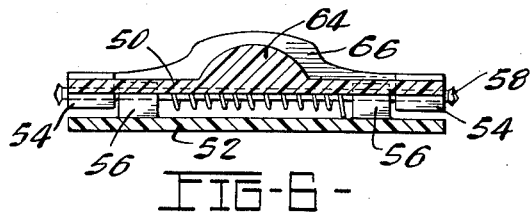
FIG-6-
INVENTORS:
CHARLES W. LEYBOURN
BY GEORGE W. GENSLER.
Harry O. Ernsberger
ATTY.

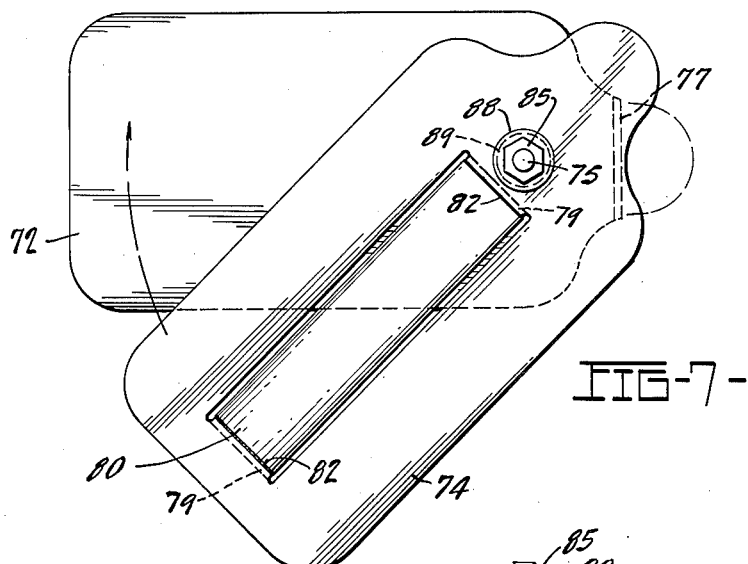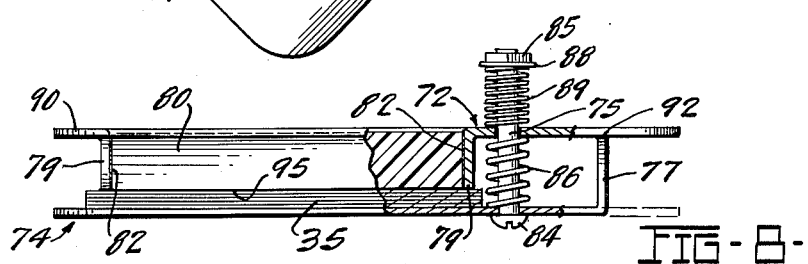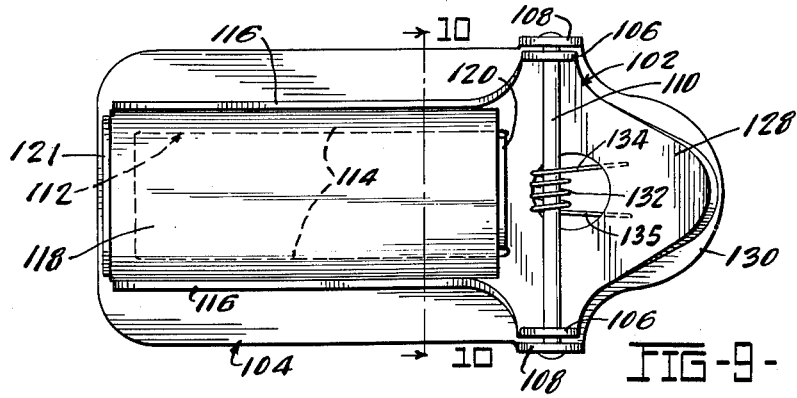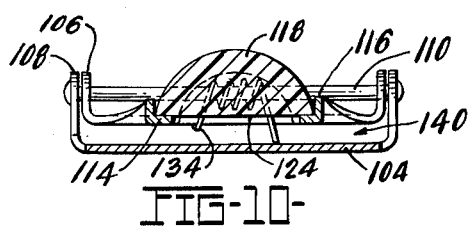

United States Patent Office 3,065,668
Patented Nov. 27, 1962

3,065,668
MAP HOLDER AND VIEWING DEVICE
Charles W. Leybourn, Petersburg, Mich., and George W. Gensler, Toledo, Ohio, assignors to Leybourn Specialties, Inc., Toledo, Ohio, a corporation of Ohio
Filed Dec. 22, 1954, Ser. No. 476,893
3 Claims. (Cl. 88—39)

This invention relates to combined map holder and viewing device and more especially to a device usable for magnifying or rendering more readily visible portions of a highway or route map.

It has been customary or conventional practice for retail outlets of automotive products and travel agencies to supply motorists with highway or route maps as an aid to the motorists in traveling. Maps of this character portrays the highways and routes of a state and bear identifying route or highway numbers or other designations. Maps of this character are usually of a size 18" x 36" and when folded occupy an area of 4" x 9". Because of the restricted size of highway or road maps, the names of cities and towns and the numerals identifying routes and highways are necessarily small, rendering it difficult for a motorist to readily ascertain a particular route without stopping the vehicle and making a close inspection of the map.

An object of the invention is the provision of a holder and viewing device for a map or other reading material wherein the holder is engaged with a map in a manner to dispose the portion of the map desired to be viewed or inspected in registration with a magnifying means or viewing element which magnifies or enlarges that area in registration with the magnifying means to render that portion of the map easier to read.

Another object of the invention is the provision of a magnifying means associated with a holding device adapted to receive and retain a map, chart or other reading material in desired position, the holder and viewing device being of a character to be adjusted or manipulated in any angular position with respect to the map so as to generally align or register the desired route with the magnifying means.

Another object of the invention is the provision of a combined map holder and magnifying or viewing means embodying relatively movable elements adapted to resiliently engage and grip the map to frictionally retain the map in a position wherein the desired portion of the map is in registration with the magnifying means and prividing a device of this character which may be quickly removed from the map or adjusted over the map area as may be desired.

Another object of the invention resides in a combined map holder and viewing device wherein the map-engaging elements of the device may be formed of sheet metal or of molded plastic materials and the magnifying means or elements may be formed of glass, molded plastic or the like as independent members or wherein the magnifying means may be integrally formed with one of the map-engaging elements.

Further objects and advantages are within the scope of this invention such as relate to the arrangement, operation and function of the related elements of the structure, to various details of construction and to combinations of parts, elements, per se, and to economies of manufacture and numerous other features as will be apparent from a consideration of the specification and drawing of a form of the invention, which may be preferred, in which:

FIGURE 1 is a top plan view illustrating a form of the invention in map-holding position;

FIGURE 2 is a longitudinal sectional view taken substantially on the line 2—2 of FIGURE 1;

FIGURE 3 is a vertical sectional view taken substantially on the line 3—3 of FIGURE 2;

FIGURE 4 is a view illustrating a modified form of the construction shown in FIGURES 1 through 3;

FIGURE 5 is an elevational view illustrating another form of the invention;

FIGURE 6 is a vertical sectional view taken substantially on the line 6—6 of FIGURE 5;

FIGURE 7 is a plan view illustrating a modified form of the invention;

FIGURE 8 is an elevational view, certain parts being shown in section, of the construction illustrated in FIGURE 7;

FIGURE 9 is a top plan view illustrating another form of the invention, and

FIGURE 10 is a vertical sectional view taken substantially on the line 10—10 of FIGURE 9.

While the device of the present invention is especially adaptable for use with highway and route maps, it is to be understood that the arrangement of the invention may be utilized for magnifying or rendering readily visible other material such as charts, graphs, pages of books, brochures, pamphlets or the like wherever the same may be found to have utility.

Referring to the drawings in detail and first to the arrangement shown in FIGURES 1 through 3, this form of construction includes members 10 and 12, member 10 being formed with downwardly projecting ears or projections 14 and member 12 being formed with upwardly extending projections 16. Each of the projections 14 is disposed adjacent one of the projections 16 and in overlapping relation therewith. The projections 14 and 16 are formed with aligned openings to receive a stub shaft, pin or other means 18 which articulately joins the members 10 and 12 together for relative pivotal movement about the axis of the shaft or pin 18. The members 10 and 12, which are of plate-like or uniplanar character, may be fashioned of sheet metal such as aluminum, steel or other suitable material. The members 10 and 12 are formed with portions 20 and 22, respectively, projecting in a lefthand direction as viewed in FIGURE 2 from the zone occupied by the shaft or pin 18. The members 10 and 12 are formed with tab-like manipulating portions 24 and 26, respectively, extending in a righthand direction from the zone of the shaft 18 as viewed in FIGURE 2.

The members 10 and 12 are biased in a direction urging the portions 20 and 22 toward each other by a resilient means in the form of a coil spring 30, the coils of which surround the pin or shaft 18 in the manner illustrated in FIGURES 1 and 2. One end 31 of the spring 30 contacts the tab-like portions 24 of member 10 and the other end portion 32 of the spring contacts or engages the tab-like portion 26 of member 12.

The portion 22 of member 12 is of flat or uniplanar shape or configuration as illustrated and is adapted to be engaged with a map 35, the latter, being in folded condition, presenting a compact group of several layers as illustrated in FIGURE 2. The portion 20 of member 10 is formed with downwardly extending flanges or portions 37 and disposed between the flanges 37 is a magnifying means or lens 39 of elongated shape. The lens or magnifying means 39 may be formed of substantially transparent glass or molded plastic such, for example, as Lucite which is an acrylic resin, or the like, and is bonded or held in position by cementitious or bonding material 40 disposed between the end zones of the lens 39 and the inner or opposed walls of the projections 37. As particularly shown in FIGURES 2 and 3, the lens construction is formed with a uniplanar or flat lower surface 42 and a curved upper surface 43. The surface 42 is adapted to engage the upper surface of the upper sheet of the folded map 35 and serves to magnify or render more readily visible that area or zone of the map in registration with the central longitudinal zone of the magnifying means or lens 39.

The arrangement shown in FIGURES 1 through 3 is illustrated in conjunction with the map 35 in folded condition which is disposed between the lower planar surface 42 of the lens 39 and the upper surface of portion 22 of the member 12. The lens 39 supported upon member 10 and portion 22 of member 12 are resiliently urged into gripping or frictional engagement with the map 35 under the biasing influence of the expansive coil spring 30. The tab-like portions 24 and 26 form handgrip or manipulating means for the user of the device to effect relative pivotal movement of the members 10 and 12 about the axis of the shaft 18 in affixing or removing the device to a map or in adjusting the relative position of the viewing device with respect to the map.

In the use of the device, the tab-like portions 24 and 26 may be gripped by the fingers of the user and urged toward each other. This movement of portions 24 and 26 winds up the spring 30 and moves the portions 20 and 22 away from each other providing a gap or space between the lower surface 42 of the lens 39 and the upper surface of the portion 22. The map may then be inserted in the gap and the position of the device adjusted to bring that portion of the map desired to be magnified in registration with the central longitudinal zone or area of the lens 39.

When the device has been so adjusted, the user releases pressure upon the portions 24 and 26 whereby the biasing force of the spring 30 acts upon the members 10 and 12 to urge portions 20 and 22 toward each other to frictionally grip the map 35 between the lens surface 42 and the portion 22 of member 12.

When it is desired to change the relative position of the viewing or magnifying device with respect to the map or to remove the map from the device, the user again grasps the tab-like portions 24 and 26 and exerts pressure upon the tab-like portions, thus releasing the surface 42 of the lens and the upper surface of portion 22 from gripping engagement with the map. It is to be understood that the map holding and viewing device may be adjusted to any angle or direction with respect to the map in order to bring the magnifying lens 39 in registration with a route line on the map desired to be traveled by the motorist.

Thus, the arrangement of the invention may be disposed with the lens portion extending at right angles to the plane of the edge of the map or it may be angularly arranged, one such angular position being shown in FIGURE 1. Route maps of the character with which the device finds particular use are folded or compacted in a manner so that a simple operation of folding the map to render another portion visible is easily accomplished after which the holder and viewing device may be affixed to the map over another area thereof.

FIGURE 4 illustrates an end zone of a construction similar in character to that shown in FIGURES 1 through 3. In this form the portion 22' of the viewing device may be equipped with a strip 45 of friction material cemented or bonded to the member 22'. The strip 45 may be fashioned of pressed cork, rubber, synthetic rubber or the like having a comparatively high friction coefficient or characteristic for exerting added gripping pressure upon the map 35 disposed in the position indicated in broken lines in FIGURE 4, the upper surface of the map being engaged with the lower surface 42' of the lens 39' carried by the portion 20'. The arrangement shown in FIGURE 4 functions in the same manner as the construction shown in FIGURES 1 through 3.

FIGURES 5 and 6 illustrate another form of the map holder and magnifying device of the invention. In this form of construction, members 50 and 52 are preferably fashioned of molded plastic material such as acrylic, methyl methacrylate or polystyrene resins or other well-known moldable plastic resins. The member 50 is formed with projections or enlarged portions 54, and the member 52 is formed with upwardly extending portions or projections 56, the projections or portions 54 and 56 being formed with openings aligned to receive a pivot shaft or pin 58 for articulately connecting the members 50 and 52 together for relative movement about the axis of the shaft or pin 58. The member 50 is integrally formed with a portion 60 extending in a lefthand direction from the zone of the pivot pin 58 as shown in FIGURE 5. The member 52 is formed with a portion 62 extending substantially coextensive with the portion 60 of member 50. The portion 60 may be integrally molded or formed with a magnifying lens portion or magnifying means 64 preferably formed of the material of which member 50 is molded. The portion 64 is substantially transparent in order to provide a magnifying, viewing area for use with a map 35' that may be inserted in the space 70 between the lower surface of portion 60 and the upper surface of portion 62.

The members 50 and 52 are formed respectively with tab-like portions or extensions 66 and 68 extending in a righthand direction from the zone of the shaft 58 as viewed in FIGURE 5. The projection 66 is inclined upwardly with respect to projection 68 in order to facilitate movement of the projections 66 and 68 toward each other to affix or insert a map between the portions 60 and 62 of the viewing device.

The portions 60 and 62 are normally resiliently biased toward each other under the influence of an expansive coil spring 30', one end 31' of the spring engaging the projection 66, the other end 32' engaging the projection or tab-like portion 68 so as to exert a force or bias urging portions 60 and 62 together. The biasing pressure of spring 30' is effective upon portions 60 and 62 to cause the said portions to frictionally grip a map disposed in the space 70 between the portions.

The combined map holder and magnifying device shown in FIGURES 5 and 6 is used in the same manner as the arrangement shown in FIGURES 1 through 3. By grasping the tab-like portions 66 and 68 and squeezing them toward each other, the user causes relative movement of portions 60 and 62 away from each other, the movement being of a rotational character around the axis of the shaft or pin 58 to effect release or gripping engagement of the device with a map adapted to be disposed in the space or gap 70 between portions 60 and 62. The arrangement of this form of the invention may be adjusted to any angular position with respect to the map to magify or render more easily visible any zone of the map brought into registration with the longitudinally extending magnifying portion or zone 64 of the member 50.

Another form of the invention is illustrated in FIGURES 7 and 8. In this form of construction, members 72 and 74 are formed with openings to accommodate a shaft, pin or element 75, the latter articulately joining the members 72 and 74 together for relative rotational movement about the axis of element 75. The member 72 is formed with an upwardly extending flange or portion 77 as shown in FIGURE 8. The upper member 72 is formed with downwardly extending portions or projections 79 forming a zone to receive a magnifying means or magnifying lens 80 of elongated character as shown in FIGURES 7 and 8. The end zones or surfaces of the magnifying member or lens 80 may be bonded or adhesively joined to the projections 79 by means of adhesive cement 82 or other suitable securing means.

In the form of the invention shown in FIGURES 7 and 8, the element 75 is a screw 84 having a headed portion, the opposite end portion being threaded to receive a nut 85. Disposed between the members 72 and 74 is a coil spring 86, and disposed between member 72 and a washer or disk-like member 88 adjacent the nut 85 is a second coil spring 89. The spring 89 is preferably of a greater expansive force than the spring 86 as the expansive force of spring 89 serves to urge the portion 90 of member 72 toward 74, the upper end portion 92 of projection 77 serving as a fulcrum for the member 90.

In this form of the invention, the map 35 may be received in the gap or space existent between the lower surface 95 of the lens 80 and the upper surface of the planar portion of member 74. The positioning of the map may be accomplished either by separating the portions by swinging portion 74 relative to portion 72 in the manner indicated in FIGURE 7 or the user may grasp the extreme lefthand end zones or portions of the members 72 and 74 and exert a separating pressure upon the members, in which event the member 72 will move upwardly against the expansive pressure of the spring 89 and about the end zone 92 of projection 77 as a fulcrum. In either method of inserting the map 35 in the combined holder and viewing device, the pressure of spring 89 exceeding the expansive pressure of spring 86 biases the members 72 and 74 into gripping engagement with the map.

FIGURES 9 and 10 illustrate another form of the invention. In this construction there is provided a lens-carrying member 102 and a lower member 104. The member 102 is formed with projections or ears 106 and the member 104 is formed with ears 108 which are arranged in the positions illustrated in FIGURES 9 and 10. The ears or projections 106 and 108 are formed with aligned openings to receive a shaft or pivot pin 110 for articulately or pivotally joining members 102 and 104 together.

The member 102 is formed with a portion 112 extending in a lefthand direction from the pin 110 as viewed in FIGURE 9, the portion 112 being formed with a rectangular opening defined by a ledge 114 bounded laterally by upwardly extending flanges 116 disposed at the opposite sides of a lens member 118. The portion 112 is also formed with spaced, upwardly extending flange portions 120 and 121, the flanges 116, 120 and 121 defining means for positioning the lens member 118.

The ledge portion 114 of portion 112 supports the lens 118 in the manner illustrated in FIGURE 10. A cementitious material (not shown) may be disposed between the edge zones of the lower surface 124 of the lens 118 and the ledge 114 to fixedly join or secure the lens to the member 102. It should be noted that the flange portions 116, 120 and 121 are relatively thin, being formed of sheet metal or the like, and hence obscure or cover very small zones of the map.

The members 102 and 104 are formed with projecting tab or grip portions 128 and 130 which extend in a righthand direction from the zone of the shaft 110 as shown in FIGURE 9. A coil spring 132 surrounds the shaft 110, the end zones or portions 134 and 135 of the spring 132 respectively engaging the grip portion 128 of member 102 and grip portion 130 of member 104.

The spring 132 normally biases the portions of members 102 and 104 at the lefthand zone as viewed in FIGURE 9 toward each other into gripping engagement with a map that may be inserted in a gap or space 140 indicated in FIGURE 10. The user of the device may release the map by grasping the grip portions 128 and 130 and, by exerting squeezing pressure, cause relative movement of members 102 and 104 about the axis of the shaft 110 to disengage or release the grip of the members upon the map.

It is to be understood that the lenses or lens members may be formed of glass or molded plastic of substantially transparent character and the various forms of relatively movable members forming the map holding or gripping means of the invention may be fashioned of sheet metal such as sheet steel or sheet aluminum or they may be of molded plastic of the character of the device particularly illustrated in FIGURES 5 and 6.

It is apparent that, within the scope of the invention, modifications and different arrangements may be made other than is herein disclosed, and the present disclosure is illustrative merely, the invention comprehending all variations thereof.

We claim:

1. A combined map holder and map viewing device including, in combination, a flat elongated base member, a lens carrying member of the same shape as the base member and spaced therefrom to accommodate a map, each of said members being formed with a pair of laterally extending projections, said projections of the respective members being in overlapping relation and having openings formed therein, an element extending through the openings and forming a pivotal connection between the members, said lens carrying member being formed with a rectangularly shaped map viewing opening and a pair of longitudinally spaced flanges extending toward the base member and defining the ends of the opening in the lens carrying member, an elongated magnifying lens disposed with its ends contiguous with and disposed between said flanges and in registration with the viewing opening, said lens having a planar lower surface adapted to engage a surface of the map to be viewed when a map is disposed between the base member and the planar surface of the lens, said base member and said lens carrying member being in substantially parallel relation when the planar surface of the lens is in contact with a map, and spring means normally biasing the lens carrying member toward the base member.

2. A combined map holder and map viewing device including substantially identically shaped uniplanar first and second members normally arranged in substantially parallel spaced relation, said members being formed with laterally extending overlapping projections, said projections being formed with aligned openings, a pin extending through the openings in the projection to provide a pivotal connection between said members, a portion of the first member at one side of the pin being adapted to support a map, the adjacent region of the second member being formed with an elongated viewing opening, laterally extending flanges on the second member projecting toward the map supporting portion of the other member, an elongated magnifying lens disposed between said flanges, means securing the end regions of the lens to the flanges, said lens having a planar surface normally disposed in substantially parallel relation with the map supporting portion of the first member and adapted for direct engagement with a map when the same is disposed between the planar surface of the lens and the map supporting portion of the first member, and spring means disposed adjacent the pin for normally biasing the lens carrying and map supporting portions toward each other to grip a map between the planar surface of the lens and the map supporting portion of said first member.

3. A combined map holder and map viewing device including a pair of substantially uniplanar members of the same shape arranged in spaced parallel relation, each of said members being formed with a pair of transversely extending projections intermediate its ends with said pairs of projections in overlapping relation, said projections being formed with openings, a shaft extending through the openings for pivotally joining the members together, one of said members being formed with an elongated viewing opening at one side of the shaft and a pair of transversely extending integral flanges defining the ends of the opening, an elongated magnifying lens disposed between the transversely extending flanges, means securing the end regions of the lens to said flanges, said lens being formed with a planar surface, the planar surface of the lens being arranged to directly engage a map adapted to be disposed between the other of said members and the planar surface of the lens, the planar surface of the lens and the map engaging portion of said other member being in substantially parallel relation when the lens is in map engaging position, spring means for biasing the members to grip a map between the map engaging portion of one member and the planar surface of the lens carried by the other member, said members having manipulating tab portions for effecting relative pivotal movement of the members.

References Cited in the file of this patent

UNITED STATES PATENTS

| | | |
|---|---|---|
| 540,184 | Norris | May 28, 1895 |
| 799,873 | Senge | Sept. 19, 1905 |
| 1,016,274 | Just | Feb. 6, 1912 |
| 1,169,492 | Kaufman | Jan. 25, 1916 |
| 1,518,419 | Styll | Dec. 9, 1924 |
| 1,773,899 | Kaler | Aug. 26, 1930 |
| 2,527,071 | Pierce | Oct. 24, 1950 |
| 2,737,741 | Rice | Mar. 13, 1956 |
| 2,746,346 | Gaire | May 22, 1956 |

FOREIGN PATENTS

| | | |
|---|---|---|
| 36,020 | Austria | Sept. 1, 1908 |